(12) United States Patent
Grosjean

(10) Patent No.: US 7,603,836 B2
(45) Date of Patent: Oct. 20, 2009

(54) POND DEBRIS COLLECTOR

(75) Inventor: Warren J Grosjean, 32 Juniper Rd., Wayne, NJ (US) 07470

(73) Assignee: Warren J Grosjean, Wayne, NJ (US)

( * ) Notice: Subject to any disclaimer, the term of this patent is extended or adjusted under 35 U.S.C. 154(b) by 0 days.

(21) Appl. No.: 12/011,969

(22) Filed: Jan. 31, 2008

(65) Prior Publication Data

US 2009/0193776 A1  Aug. 6, 2009

(51) Int. Cl.
*A01D 44/00* (2006.01)
(52) U.S. Cl. .............................. 56/8; 210/237
(58) Field of Classification Search ............... 56/8; 37/316; 210/237, 238, 470, 167.2
See application file for complete search history.

(56) References Cited

U.S. PATENT DOCUMENTS

| | | | |
|---|---|---|---|
| 373,646 A * | 11/1887 | Cook | 37/316 |
| 1,703,402 A | 2/1929 | Matsuoka | |
| 3,113,389 A * | 12/1963 | Vuskovich | 37/316 |
| 3,367,048 A * | 2/1968 | Doughty | 37/316 |
| 3,811,325 A * | 5/1974 | Carter | 73/863.23 |
| 3,830,004 A * | 8/1974 | Poirot | 43/4.5 |
| 4,053,412 A * | 10/1977 | Stix | 210/167.2 |
| 4,362,631 A * | 12/1982 | Bocard et al. | 210/776 |
| 4,379,351 A * | 4/1983 | Hinsperger | 4/498 |
| 4,518,495 A | 5/1985 | Harding | |
| 5,235,797 A | 8/1993 | Sygen | |
| 5,453,190 A * | 9/1995 | Martin, Sr. | 210/241 |
| 5,487,258 A | 1/1996 | McNabb | |
| 5,705,058 A * | 1/1998 | Fischer | 210/237 |
| 6,306,295 B1 * | 10/2001 | Giacalone | 210/167.2 |
| 6,672,039 B1 | 1/2004 | Shonnard | |
| 7,232,523 B2 | 6/2007 | Clay | |
| 2002/0095852 A1 * | 7/2002 | Bosteels et al. | 43/6.5 |
| 2003/0044233 A1 * | 3/2003 | Hillard et al. | 405/21 |
| 2004/0115003 A1 * | 6/2004 | Johnston | 405/63 |

* cited by examiner

*Primary Examiner*—Árpád Fábián-Kovács

(57) ABSTRACT

A buoyant device for use by one or two persons to skim from the surface of bodies of water the vegetative matter that accumulates thereon so as to facilitate its disposal. The device consists of a cylindrical screen formed to the configuration of the letter C with the top lip being held at the water's surface by a buoyant bar and the lower lip being positioned below the upper lip by a weighted bar; a harness attached to the buoyant bar is used to pull the device across the water's surface.

1 Claim, 1 Drawing Sheet

Direction of Movement

POND DEBRIS COLLECTOR

CROSS REFERENCE TO RELATED APPLICATIONS

Not applicable.

STATEMENT REGARDING FEDERALLY SPONSORED RESEARCH

There was no Federal support for this research or development.

BACKGROUND OF THE INVENTION

1. Field of the invention

This invention is in the field of the collecting and removal of debris from the surface of ponds.

2. Background

Field of Search—US Class 210/470; 210/242.1; 210/238; 210/167.2; 119/213; 56/8; 56/9; 43/11; 43/14; 43/102; 43/104; 43/105

| Intl. Class E04H 4/16; E04H 4/00; E04H 003/20 | | | | |
|---|---|---|---|---|
| Patents- | 1,703,402 | Feb. 26, 1929 | Matsuoka | 56/8 |
| | 4,518,495 | May 21, 1985 | Harding | 210/470 |
| | 5,235,797 | Aug. 17, 1993 | Sygen | 56/9 |
| | 5,487,258 | Jan. 30, 1996 | McNabb | 56/9 |
| | 6,672,039 | Jan. 06, 2004 | Shonnard | 56/8 |
| | 7,232,523 | Oct. 27, 2003 | Clay | 210/238 |

On the surface of bodies of water there often accumulates debris including filamentous algae and various floating aquatic plants. This invention is a device to be used by one or two persons for the removal of this surface debris on small bodies of water, shallow water, or where the use of heavy equipment is not justified.

Search of prior art identifies many devices intended to remove the debris on the surface of swimming pools or large bodies of water; there appears to have been no effort to find an effective way in which to remove the floating debris from the surface of ponds and shallow bodies of water. The referenced prior art is as close to addressing this problem, al-be-it in different situations, as I can find. The closest of all the patents found is the Harding U.S. Pat. No. 4,518,495. Harding disclosed a means of skimming the surface debris from swimming pools with netting held open by a rectangular frame supported by pontoon shaped floats; in some respects it is quite similar but certainly not intended nor capable of the accumulation of the relatively large amounts of debris often encountered in ponds. Other solutions proffered for pools include circulation pumps with screens, and screens of the general shape of a tennis racquet or fish net with long handles—again not applicable to the gross debris accumulations found on ponds.

SUMMARY OF THE INVENTION

This invention defines a means of catching and removing floating materials from ponds or similar water bodies—a device that can be used by one person. It is essentially a rectangular shaped screen with one edge attached to a floating bar and the opposite edge attached to a heavier than water bar. There are lines attaching the ends of the bars to provide for proper spacing of the bars and consequently the configuration of the opening into the screen. There is a harness attached to the floating bar and a rope attached to the harness to provide for pulling the device thru the water. The screen forms an open ended semi-cylindrical basket as the device is drawn through the water holding any debris that enters between the floating bar and the heavier than water bar. The device can be thrown from shore and retrieved by the person on shore, it can be dragged behind a row boat, or it can be attached to the prow of a power boat and pushed thru the water. When a desired amount of material has been accumulated, the device is brought to shore and emptied.

DESCRIPTION OF PREFERRED EMBODIMENTS

Figure 1:
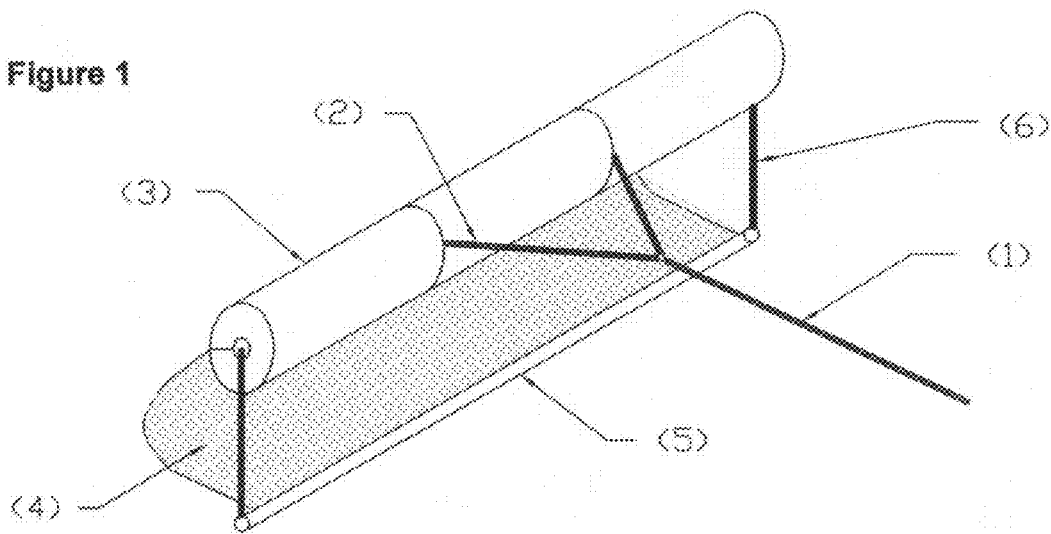
FIG. 1 is an isometric projection showing the design of the debris remover.
Figure 2:
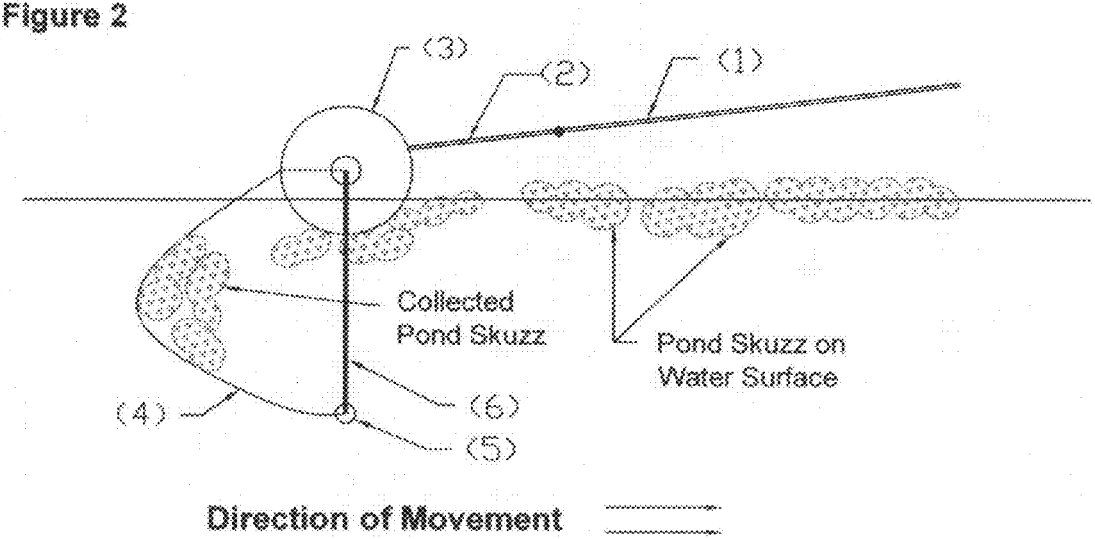
FIG. 2 shows the debris remover being drawn across the surface of a pond.

The width of the device is limited by the weight and drag of the trapped debris—four to six feet is a reasonable width for most applications.

There are six components of this invention:—(1) a pull rope, (2) a harness, (3) a flotation bar, (4) an accumulation screen, (5) an opening control bar, (6) a pair of opening control regulators.

The pull rope 1 is ¼ to ⅜ inch diameter and whatever length is required for the particular application.

The harness 2 is a light rope that attaches the flotation bar in two or more locations to a central spot where the pull rope is attached.

The flotation bar 3 consists of a length of aluminum tubing of diameter ¾ inch; wholly or partially encompassed with expanded plastic tubing. The limitation on the minimum diameter of the buoyancy device is that it must maintain the assembly sufficiently high in the water so that the debris will not wrap around the flotation bar but will pass under the flotation bar into the accumulation screen. A diameter of 3 to 6 inches is appropriate for most applications.

The accumulation screen 4 is window screening of length 3 or more feet and width equal to the length of the flotation bar. Across the length of the screen on the edges there are tubes integral with the screen into which the flotation and opening control bars are inserted.

The opening control bar 5 is a metal bar of diameter ½ inch and of length equal to the length of the flotation bar.

Opening control regulators 6 attaching the ends of the flotation bar and the opening control bar.

There are four principle ways in which the device can be used:

A. In the case of a small body of water, the device is placed in the water on one shore, the pull rope is taken to the other side, the device is pulled across the pond and emptied. This is repeated until the pond is cleared. A variation of this use is the attachment of two ropes to the harness, one rope to each shore, and the device is pulled back and forth by a person on each shore.

B. The device is tossed out into the pond and retrieved using the pull rope.

C. A pole is attached to the pull rope and the device is pulled through the water.

D. The device is pulled by a person walking in the water, pulled behind a small boat or pushed ahead of a power boat.

What is claimed is:

1. A floating device intended to be pulled by one person on the surface of a pond or lake to collect and remove floating plants and algae comprising:
   a rectangular strip of screen material having an upper edge and a lower edge;
   a rigid flotation bar attached to the upper edge of the screen material for the purpose of providing buoyancy;
   a rigid opening control bar attached to the lower edge of the screen material for the purpose of applying a downward force thereto so as to cause the screen to be oriented in the water with the lower edge below the buoyant upper edge;
   opening control regulators attaching the ends of the flotation bar and the opening control bar so as to define the vertical spacing between the flotation bar and the opening control bar; this vertical spacing being less than the length of screen between the flotation and opening control bars, causing the screen to be cylindrical with one open side; and
   a pull rope attached to the flotation bar for the purpose of pulling the floating device along the surface of a water body.

* * * * *